P. A. SHEAFF.
CIRCLE DRAWING ATTACHMENT FOR MICROSCOPES.
APPLICATION FILED DEC. 14, 1914.
1,129,742.
Patented Feb. 23, 1915.
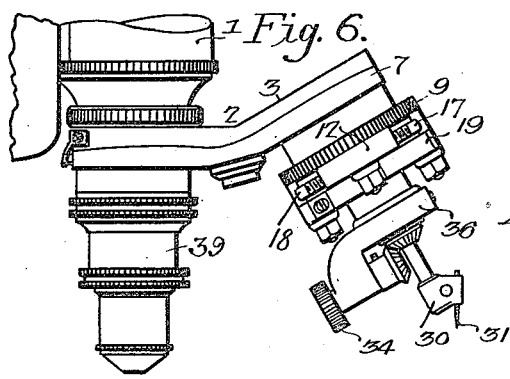
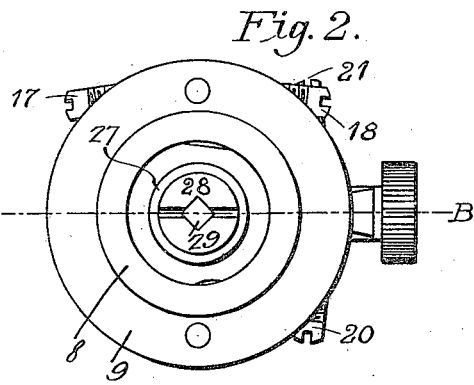
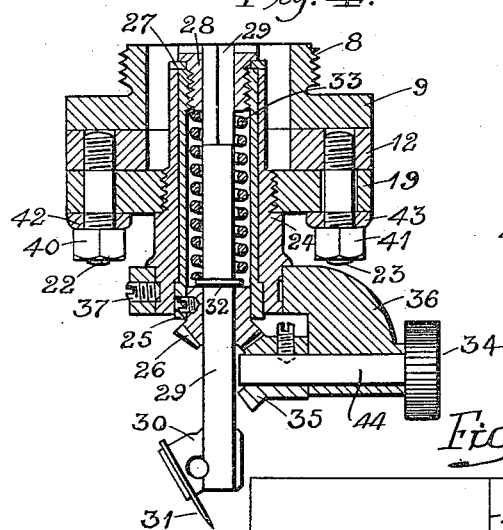
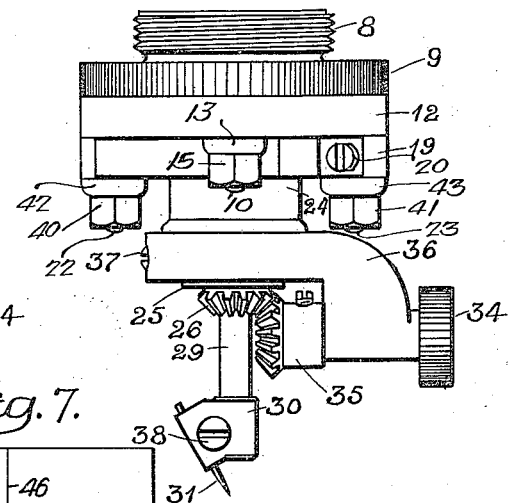
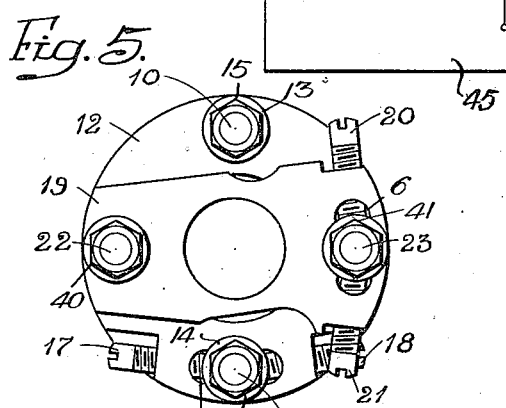
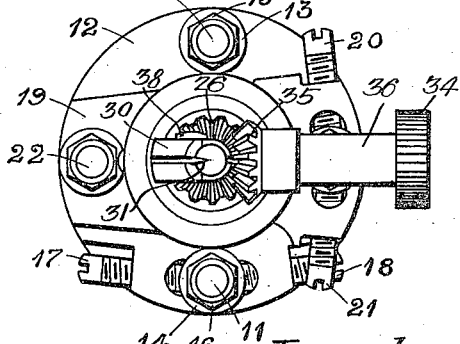
Witnesses—
Will A Burrows
Charles H. York
Inventor—
Philip A. Sheaff
by his Attorneys—
Howson & Howson

UNITED STATES PATENT OFFICE.

PHILIP A. SHEAFF, OF PHILADELPHIA, PENNSYLVANIA.

CIRCLE-DRAWING ATTACHMENT FOR MICROSCOPES.

1,129,742.

Specification of Letters Patent.

Patented Feb. 23, 1915.

Application filed December 14, 1914. Serial No. 877,143.

*To all whom it may concern:*

Be it known that I, PHILIP A. SHEAFF, a citizen of the United States, residing in Philadelphia, Pennsylvania, have invented certain Improvements in Circle-Drawing Attachments for Microscopes, of which the following is a specification.

In microscopic work and especially in teaching or demonstration, it frequently becomes necessary or desirable to refer to a certain field or object and in cases where the higher powers of magnification are used, such reference to a particular object is not always easily and quickly accomplished.

One object therefore of my invention is to provide an attachment for a microscope whereby a particular point upon a microscopic slide may be quickly and accurately located, the invention contemplating a novel, simple and easily operated device for making certain definite marks upon a so called "master" slide with a view to rendering it possible to quickly and accurately locate a definite point or points upon a slide carrying a specimen under examination.

Another object of the invention is the provision of a novel succession of steps for locating or relocating a definite field upon a microscopic slide.

These objects and other advantageous ends I secure as hereinafter set forth, reference being had to the accompanying drawings, in which, Figure 1 is a side elevation of the apparatus constituting my invention; Figs. 2 and 3 are respectively a plan and an inverted plan of the apparatus shown in Fig. 1; Fig. 4 is a vertical section on the line A—B, Fig. 2; Fig. 5 is an inverted plan of the body of the apparatus after the sleeve and its attached parts have been removed; Fig. 6 is an elevation on a reduced scale showing the manner of connecting my invention to a microscope; and Fig. 7 is a plan of the master slide.

In Fig. 6 of the above drawings, 1 represents the tube of a microscope equipped with a mechanical stage, (not shown) and with a nose piece 2 which may be of the double, triple, or any other multiple form. In any case this nose piece includes a member 2 rigidly connected to the body or tube of the microscope and on which is pivotally mounted a second plate 7 having a plurality of threaded openings in which may be mounted the objectives to be used with the microscope, one of these being shown at 39. In another one of said openings of the nose piece is threaded a ring 8 forming part of an annular plate or flange 9 which carries on its face two oppositely placed studs 10 and 11 and is peripherally milled. On one of these studs, as 10, is pivotally mounted an annular plate 12 preferably circular in form and of substantially the same dimensions as the plate 9, having diametrically opposite the opening for the stud 10, a slot 5 through which passes the second stud 11. Said plate is retained in position against the plate 9 by nuts and washers carried on the two studs 10 and 11 and in addition has mounted in it two set screws 17 and 18 placed to extend from opposite sides into the slot 5 so as to engage the stud 11. By backing off one of these screws and tightening the other it is thus possible to swing the plate 12 on the stud 10 as a pivot and to rigidly hold it in any given position, the nuts 15 and 16 being loosened to allow this adjustment and tightened after its completion.

Upon the outer face of the plate 12 is a second adjustable plate 19 pivotally mounted upon a stud 22 projecting from said plate 12, there being also a second stud 23 on said plate diametrically opposite the stud 22, which with it lies in a line at right angles to a line connecting the studs 10 and 11. The plate 19 is likewise provided with a slot 6 for the passage of the stud 23 and has a pair of adjusting screws 20 and 21 extending into said slot in positions to engage opposite sides of said stud. Said plate has a centrally threaded opening in which is rigidly screwed a sleeve 24 forming a bearing for a hollow tube 25, one end of which is provided with an annular shoulder and fits into a corresponding recess in the sleeve 24, while the opposite end is internally threaded for the reception of a flanged nut 28.

Mounted on what is the lower end of the tube 25 is the hub of a beveled gear 26 held in place by a suitable set screw and having a spindle 29 passing centrally through it as well as through the nut 28. The portion of the spindle passing through the nut is square in section and the opening through said nut is correspondingly formed so that a limited longitudinal movement is possible although it is compelled to turn with the tube. Said spindle immediately adjacent the inner end of the hub of the beveled gear 26 is provided with a collar 32 and between this and the nut 28 is mounted a coil spring 33 whereby said collar is normally maintained in engagement with said gear.

Rotatably mounted on the lower end of the sleeve 24 is an arm 36 provided with a set screw 37 designed to enter an annular groove in said sleeve and clamp the two parts together when it is set up, the arm serving as a bearing for a second spindle 44 extending at right angles to the spindle 29 and having fixed to its inner end a beveled gear 35 meshing with the gear 26. The outer end of this second spindle has fixed to it a milled thumb wheel whereby it with its associated parts may be rotated at will.

On the lower end of the spindle 29 is mounted a clamp 30 carrying a needle 31 preferably extending at an angle of 30° to the line of said spindle and which may be adjusted longitudinally to vary the distance of its point from the axial line of the spindle 29; it being retained in such adjusted position by tightening the clamp screw 38. The clamp is held from rotating relatively to the spindle since the clamping screw 38 is caused to pass through a notch in the lower end thereof in addition to passing through and connecting the two parts of said clamp.

Under conditions of use it will be understood that the microscope is equipped with a double, triple or quadruple nose piece and my attachment above described is preferably screwed into the opening intended for the lowest power objective. An ordinary microscopic slide is then lightly coated on one side with an alcoholic solution of 7% orange shellac colored with .3% eosin, preferably applied with a camel's-hair brush. This master slide 45 illustrated in Fig. 7 is then mounted in the mechanical stage of the microscope and the nose piece is adjusted to bring my device into the center line of the instrument. Thereafter said device is lowered until the needle 31 rests upon the shellac film on the slide and by slacking off the nuts on the studs 10 11, the plate 12 may be swung on the first of these by the adjustment of the screws 17 and 18. Thereafter by a similar adjustment of the plate 19 through its set screws 20 and 21 the structure supporting the spindle 29 may be so moved as to bring the point of the needle 31 to a position any desired distance from the central axis of the instrument. It may then be rotated by turning the thumb wheel 34 so as to draw or scribe a circle upon the shellac coating of the slide, its adjustment being such that when the objective 39 is thrown into position said circle will not only be concentric with its center line but will just fit within the border of its field. The apparatus so adjusted is now in condition for use and requires no further adjustment as long as it is to be used with the objective then in position. If, after a specimen slide bearing a microscopic specimen has been placed in the mechanical stage under the microscope, it becomes desirable to refer at some future time to a definite portion of said specimen or to some object on the slide, this desirable end may be quickly attained by the use of the apparatus above described. For example, in blood work it may be desirable to refer at some future time to a certain cell or parasite which it has required much time to originally find and for this purpose the said parasite is placed in the center of the field, the objective 39 is swung out of and my attachment is swung into position in the center line of the instrument. Without moving the mechanical stage the specimen-bearing slide is replaced by the master slide on whose film a circle is then drawn, as above described, after which, without raising the needle from said film, the mechanical stage is operated to draw the slide toward the operator, thus causing said needle to cut a line 46, directly from the circle 47 to the top edge of said slide. The master and specimen slides are now labeled or otherwise provided with a record for future identification so that when it is desired at some future time to relocate the particular cell or parasite, etc., previously under examination, the master slide is placed in the mechanical stage, the objective brought to focus upon the upper portion of the slide adjacent its edge, and the mechanical stage is adjusted to rapidly move the slide in a longitudinal direction until the line 46 comes into the field. The stage is then transversely adjusted to move the slide parallel to the line until the circle 47 comes into the field of the objective and is properly centered. Obviously if the master slide be removed and the specimen slide be replaced upon the mechanical stage without the latter having been further moved, the object originally noted on the slide will again occupy the center of the field.

If desired a number of circles may be inscribed upon one master slide and lines drawn from each of them to the top or other edge of the slide. Such lines would preferably be directly labeled upon the film of the master slide to make proper reference to the corresponding objects which may be found on the specimen slide by adjusting the mechanical stage and inserting said latter slide as previously described.

While I have found that drawing a circle as above described is the most convenient means for making upon the master slide a record of the position occupied by some definite object upon a specimen slide, it is obvious that without departing from my invention, other geometrical figures or symbols may be described upon the master slide for the same purpose or in some instances be formed on or so cut into the coating on the master slide in order to serve as a guide to find the desired specimen or portion thereof upon the specimen slide.

I claim:—

1. An attachment for a microscope consisting of an adjustable device for making a circle on a slide; and means for attaching said device to the nose piece of the microscope.

2. An attachment for a microscope consisting of a rotary device including a needle extending at an angle to the axis of rotation thereof for cutting a line or lines on a slide; and means for mounting said device on the nose piece of the microscope.

3. An attachment for a microscope consisting of a device including a scribing point; means for causing said point to describe a reference mark upon a slide; and means for connecting said device to the nose piece of a microscope.

4. An attachment for a microscope consisting of a device including a scribing point; means for rotating said point to describe a circle; and means for attaching said device to the nose piece of a microscope.

5. An attachment for a microscope consisting of a member for connection to the nose piece thereof; a spindle mounted in said member; a needle carried by the spindle; and means for rotating the spindle at will to cause the point of the needle to describe a circle.

6. An attachment for a microscope consisting of a member having means for connecting it to the nose piece thereof; a spindle supported by said member; a needle carried by the spindle and extending at an acute angle to the center line thereof; and means for rotating the spindle at will to cause the needle to describe a circle.

7. An attachment for a microscope including a member formed for connection to the nose piece thereof; a spindle supported by said member; a needle carried by said spindle; means for rotating the spindle to cause the point of the needle to describe a circle; and means for bodily adjusting the spindle transversely of said supporting member.

8. An attachment for a microscope including a member formed for connection to the nose piece thereof; a plate mounted on said member; means for adjusting said plate transversely of the member; and means carried by the plate for describing a circle.

9. An attachment for a microscope consisting of a member formed for connection to the nose piece thereof; a plate mounted on said member and adjustable transversely thereof; a second plate mounted on the first plate and adjustable at right angles to the line of adjustment thereof; and means carried by the second plate for describing relatively minute circles.

10. An attachment for a microscope consisting of a member formed for connection to the nose piece thereof; a needle mounted on said member and free to yield longitudinally; with means for rotating the needle at will.

11. An attachment for a microscope including a member formed for connection to the nose piece thereof; a spindle carried by said member; a spring normally acting on the spindle to permit its longitudinal movement; a needle carried by the spindle; and means for rotating said needle at will.

12. An attachment for a microscope consisting of a member for connection to the nose piece thereof; an elongated tube rotatably carried by said member; a beveled gear connected to said tube; a spindle supported in the tube; a needle carried by the spindle; a second beveled gear meshing with the first gear; and means for rotating said second gear at will.

13. An attachment for a microscope consisting of a member threaded to fit the nose piece thereof; a plate mounted on said member and adjustable transversely thereof; a second plate mounted on the first plate and adjustable thereof at right angles to the line of adjustment of the first plate; a sleeve carried by the second plate; a tube rotatably mounted in said sleeve; a spindle in the tube; a needle carried by the spindle; and means for rotating said tube and spindle at will.

14. The combination in a microscope of a rotatable nose piece; an objective carried by said nose piece; and a device also carried by the nose piece in position to describe upon a slide a circle concentric with the field of said objective.

15. The combination of a microscope; a slide having a specimen definitely placed thereon; with a master slide having a reference mark placed in the same position relative to certain of its edges as said specimen is placed upon said first slide.

16. The combination of a slide having a microscopic specimen definitely placed thereon with reference to certain of its edges; and a master slide having upon it a reference mark in the same relative position as that of the specimen on said first slide.

17. The combination of a slide having a microscopic specimen definitely placed thereon with reference to certain of its edges; and a master slide having upon it a reference mark in the same relative position as that of the specimen on said first slide, there being a guide line on the master slide leading from said reference mark toward the side of said slide.

18. The combination of a slide having a specimen definitely placed thereon with reference to certain of its edges; and a master slide having a circle placed in the same relative position as said specimen on the first slide.

19. The combination of a slide having a specimen definitely placed thereon with reference to certain of its edges; and a master slide having a circle placed in the same relative position as said specimen on the first slide, there being a line leading from said circle to the edge of the slide.

20. The method of operating a microscope which consists in locating a microscopic specimen upon a specimen slide; forming a reference circle upon a master slide occupying the same relative position in the microscope as said specimen slide; and thereafter drawing a guide line from the circle.

21. The method of operating a microscope which consists in locating a specimen upon a specimen slide; replacing said slide by a master slide; forming on said master slide a reference mark in the field originally occupied by the specimen; drawing a guide line from said reference mark to the edge of the slide; and thereafter relocating the specimen by bringing the guide line into the field of the microscope; moving the master slide with the guide line in the field until the reference mark appears; and thereafter replacing the master slide with the original specimen slide.

22. The method of operating a microscope which consists in locating a microscopic specimen upon a specimen slide, and thereafter forming a reference line upon a master slide while it occupies the same relative position in the microscope as said specimen slide.

In testimony whereof, I have signed my name to this specification, in the presence of two subscribing witnesses.

PHILIP A. SHEAFF.

Witnesses:
WILLIAM E. BRADLEY,
WM. A. BARR.